United States Patent [19]

Kapocsi

[11] Patent Number: 4,975,005
[45] Date of Patent: Dec. 4, 1990

[54] HEARING AID SHAPE CUTTING ASSEMBLY

[76] Inventor: Kalman P. Kapocsi, 33 Wood St., Garfield, N.J. 07026

[21] Appl. No.: 333,899

[22] Filed: Apr. 6, 1989

[51] Int. Cl.$^5$ ............................................. B23C 3/12
[52] U.S. Cl. .................................... 409/138; 409/229; 144/134 A
[58] Field of Search ............... 409/229, 97, 110, 138; 144/82, 83, 372, 143, 144.5, 134 A, 144 C, 144 A, 154, 240, 241, 1 F; 51/102, 103 R, 128, 283 E, 284 E

[56] References Cited

U.S. PATENT DOCUMENTS

| 240,934 | 5/1881 | Towne | 144/145 R |
| 1,472,510 | 10/1923 | Briddell | 144/145 A |
| 1,715,660 | 6/1929 | Knight | 144/145 A |
| 2,062,416 | 12/1936 | Howard | 144/145 A |
| 2,314,660 | 3/1943 | Peterman | 144/134 A |
| 4,537,234 | 8/1985 | Onsrud | 144/134 A |

FOREIGN PATENT DOCUMENTS

| 1921879 | 4/1969 | Fed. Rep. of Germany | 144/134 A |
| 565995 | 11/1923 | France | 144/134 A |

Primary Examiner—Z. R. Bilinsky
Assistant Examiner—Robert Schultz

[57] ABSTRACT

This invention relates to apparatus for trimming and shape cutting a hearing aid having a three-dimensional body of irregular shape and a flat plate-like member surface mounted against the body for forming an enclosure in which electronic circuitry is mounted. The flat plate-like member has a rim of excess material extending from the body of the hearing aid. The apparatus includes a framework extending from a base with a surface plate mounted on the framework. A rotary drive is connected to the framework with a tool bit extending through an opening in the surface plate. A guide member having a finger is attached to the surface plate with the finger extending over the opening above the rotary tools bit, leaving a space in which the rim of the flat plate-like member is placed for automatic removal.

5 Claims, 2 Drawing Sheets

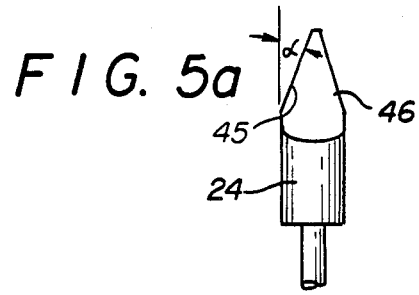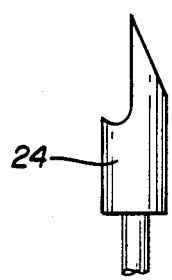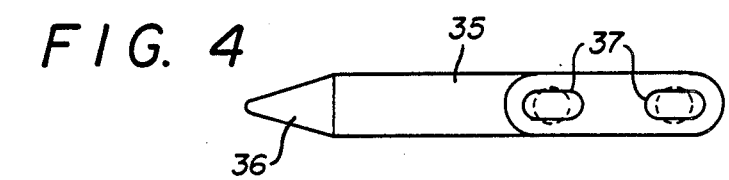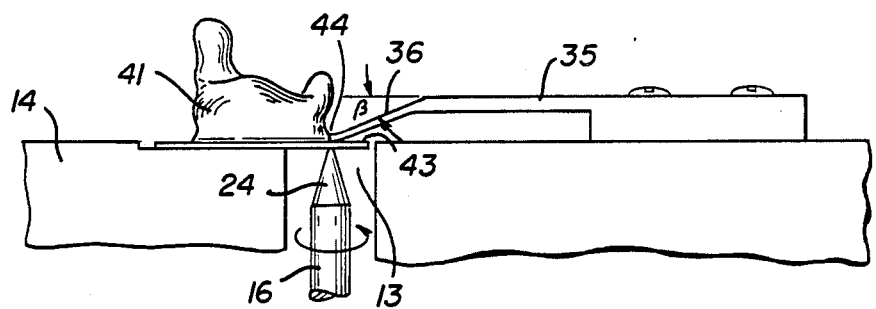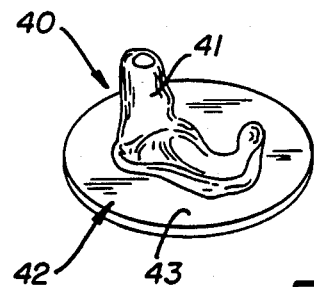

1

HEARING AID SHAPE CUTTING ASSEMBLY

FIELD OF THE INVENTION

This invention relates to apparatus for trimming and shape cutting a flat member affixed to a three-dimensional body of irregular shape, such as a hearing aid, and more particularly, to a hearing aid shape cutting assembly.

BACKGROUND OF THE INVENTION

Hearing aids are electronic devices which are inserted into the middle ear compartment of the ear anatomy to amplify certain sound frequencies for improving the transmission of sound energy into the inner ear. The hearing aid is used to overcome a hearing deficiency in certain persons relating to their inability to distinguish certain audible tones, particularly at higher frequencies, within the normal audible perception range. The hearing aid is designed to be located in the middle ear cavity adjacent the ear drum. The middle ear cavity is an irregularly shaped air-filled space in the temporal bone which varies in size and shape from person to person. For proper fit and function, the body of each hearing aid is tailored to correspond in shape and size to the middle ear cavity of the patient. This is accomplished by taking an impression of the cavity of the middle ear using a silicone material or the like, and making a hollow mold from the impression to form an open shell having a shape replicating the shape of the inner ear of the patient. The amplifying electronic circuitry and battery power cell are fitted into the open shell, which is then closed with a flat plate. Alternatively, the electronics is surface mounted upon the flat plate, which is then flush mounted against the open shell to form an enclosed body with the electronics in the interior of the body. The flat plate is bonded to the shell at the mating edges of the parts. The plate is then hand trimmed by cutting off excess material extending beyond the mated edges between the plate and body. The hearing aid is then finished by polishing. The trimming, shaping and finishing operations are performed by hand to avoid damaging the body of the hearing aid. These hand operations are labor intensive, time consuming and require substantial expertise, which contributes to the high cost in the fabrication of a hearing aid.

SUMMARY OF THE INVENTION

Apparatus for trimming and shape cutting a hearing aid having a three-dimensional body of irregular shape, and a flat plate-like member for forming an enclosure in which electronic circuitry is incorporated with the flat plate-like member surface mounted against the three-dimensional body and having a rim of excess material extending from said body of said hearing aid comprising: a base, a framework extending from the base; means connected to said framework for securing a rotary drive, a tool bit removably inserted in said rotary drive and oriented along a predetermined axis, a surface plate mounted on the framework and having an opening juxtaposed above said drill bit, guide means attached to said surface plate, said guide means having a finger extending a predetermined distance over said opening and spaced apart from said tool bit so as to permit said flat plate-like member to be mounted on said surface plate with said rim of excess plate material interposed between said finger and said tool bit, such that said finger, upon contacting said body, provides guidance to cut said excess plate material from said body.

BRIEF DESCRIPTION OF THE DRAWINGS

FIG. 2 is a perspective view of a conventional hearing aid in the process of fabrication, before the annular rim surrounding the body is trimmed and cut off;

FIG. 3 is a diagrammatic view in section showing the relative positions of the guide means and cutting tool of the hearing aid cutting assembly for trimming and cutting off excess plate material surrounding the body of the hearing aid;

FIG. 4 is a top view of the preferred guide means shown in the assembly of FIG. 1;

FIG. 5a is a side view of the preferred cutting tool in the assembly of FIG. 1; and FIG. 5b is another side view of the cutting tool of FIG. 5a, shown oriented ninety degrees from FIG. 5a.

DETAILED DESCRIPTION OF THE INVENTION

Figure 1:
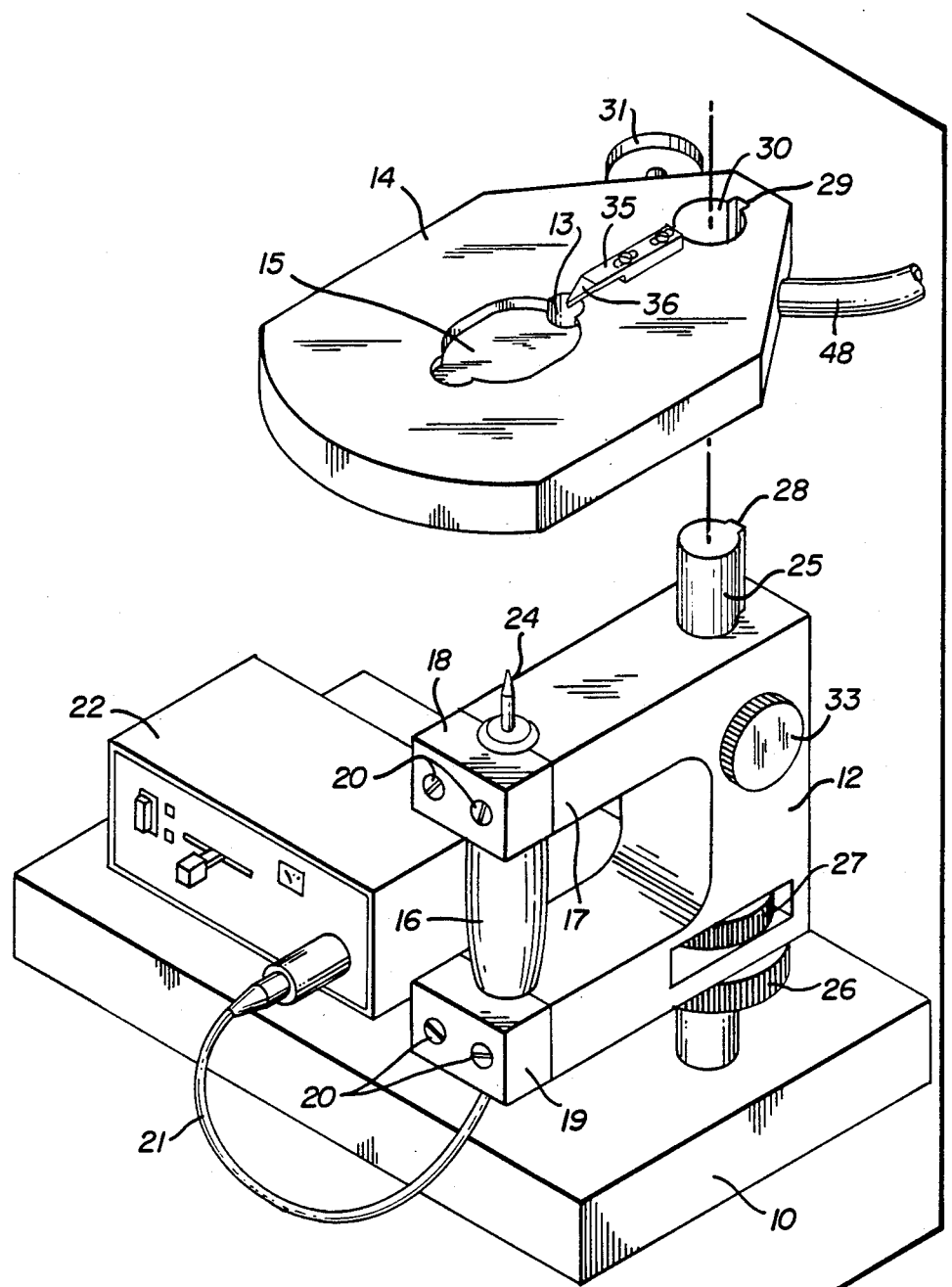
FIG. 1 is a partially exploded perspective view of the assembly of the present invention with the surface plate shown elevated from the support framework.

The apparatus of the present invention is shown in FIG. 1 and comprises a base (10), a framework (12) supported on the base (10), a surface plate (14) adapted to be mounted on the framework (12) so as to lie essentially along a horizontal plane, with the surface plate having an opening (13) and a recessed area (15) adjacent to the opening (13). A rotary drive (16), is removably connected to the framework (12). The rotary drive (16) has a narrow body which is readily secured to bifurcated arms (17) of the framework (12) by means of an upper bracket (18) and a lower bracket (19), respectively. The upper bracket (18) and lower bracket (19) may be affixed to the framework (12) by means of screws (20). The rotary drive (16) is connected through an electrical conduit (21) to any conventional control source (22) for applying electrical power to rotate the tool at a desired speed. A variable speed control is preferred. There are many commercially available speed control units (22) for rotary drills. A bit (24) is removably inserted into the rotary drive (16) and is aligned along an axis transverse to the plane of the surface plate (14).

The framework (12) is preferably adjustably affixed to a shaft (25) extending from the base (10). A pair of thumb wheels (26) and (27) are threadably connected to the framework (12) along a threaded section (not shown) of the shaft (25) to permit the framework (12) to be adjustably moved along the shaft (25) in an upward or downward direction. The framework (12) is prevented from rotating radially by a key (28), which is shown in FIG. 1, within a keyway (29) extending through the framework (12). The key (28) also extends through the keyway (29) in the support plate (14) to fix the position of the support plate (14) radially relative to the framework (12). The shaft (25) fits in the opening (30) of the support plate (14), which is locked in position by a lock nut (31). The framework (12) may also be locked in position by a lock nut (33).

A guide member (35) is mounted upon the surface plate (14). The guide member (35), as is shown in FIGS. 1, 3 and 4, lies in a direction transverse to the longitudinal axis of the cutting tool (16), and includes a finger (36) which extends over the opening (13) in the surface plate (14). The finger (36) is spaced a predetermined distance above a recessed section (15) in the surface plate (14) to provide clearance for interposing the member to be cut. The guide member (35) has elongated slotted openings (37) which permit the finger (36) to be adjustably moved along the horizontal above the opening (13). A hose (48) may be used to attach a source of vacuum.

FIG. 2 diagrammatically illustrates a typical hearing aid (40) having an irregular three-dimensional body (41). The hearing aid body (41) is a hollow, three-dimensional configuration formed from a model of the middle ear of the patient for whom the hearing aid (40) was prescribed. A flat plate-like member (42) is mounted against the body (41) to form an enclosure for enclosing electronic amplifying circuitry (not shown). The flat-plate like member (42) is bonded to the hearing aid body (41), leaving a rim of excess material (43) extending from the body (41) of the hearing aid (40). The rim of excess material (43) need not be annular in geometry.

The flat plate-like member (42) is mounted in the recess (15) of the surface plate (14) with the rim of excess material (43) extending into the opening (13) underneath the finger (36). The tool bit (24) is raised into contact with the underside of the rim (43). The plate-like member (42) is adjusted until the finger (36) comes into contact with the body (41) of the hearing aid (40). The finger (36) expedites the removal of the rim of excess material (43) by preventing the tool bit (24) from cutting into the body (41) of the hearing aid. The finger (36) lies at an angle ($\beta$) with the horizontal which is preestablished for preferably engaging the body (41), approximate the junction (44) between the rim (43) and the body (41). The finger (36) operates to keep the cutting tool from contacting the body of the hearing aid (40). Accordingly, it should lie directly in alignment above the tool bit (24) or slightly forward of the tool bit so that the junction (44) is separated axially from the tool bit.

It is preferred that the rotary tool bit (24) be a single lip milling cutter tapered with an end relief cutting surface (45), as shown in FIGS. 5a and 5b, respectively. The cutting surface (45) should have an acute inclined cutting angle ($\alpha$) of preferably about 15° and an opposing relief surface (46).

What is claimed is:

1. Apparatus for trimming and shape cutting a hearing aid having a three-dimensional body of irregular shape, and a flat plate-like member for forming an enclosure in which electronic circuitry is incorporated with the flat plate-like member mounted against the three-dimensional body to form said enclosure and leaving a rim of excess plate material extending from said body comprising: a base, a framework, means mounting said framework to extent from the base; a surface plate mounted on the framework, said surface plate having a recessed section for receiving the hearing aid and an opening extending through said surface plate adjacent to said recessed section with the rim of the hearing aid adapted to be mounted over said opening; a rotary drive for rotating a cutting bit; means for securing said rotary drive to said framework, with said cutting bit extending into said opening for rotation about an axis substantially transverse to the plane of said opening; guide means attached to said surface plate, said guide means having a finger extending in a lateral direction over said opening and forming an acute angle with the axis of rotation of the cutting bit, with said finger having a free end spaced above said cutting bit in alignment with the axis of rotation for forming a clearance therebetween to receive the rim of the hearing aid and to identify the location for the removal of material from said rim.

2. Apparatus, as claimed in claim 1, wherein said cutting bit comprises includes a single lip milling cutter with an end relief cutting surface.

3. Apparatus, as claimed in claim 2, wherein said cutting surface has an acute inclined cutting angle of about 15°.

4. Apparatus, as defined in claim 2, wherein said guide means includes a guide member extending laterally over said surface plate, with said finger being connected to said guide member.

5. Apparatus, as defined in claim 6, wherein said rotary drive comprises a motive drive means with said securing means rigidly fixing said motive drive means to said framework.

* * * * *